(12) United States Patent
Banda

(10) Patent No.: US 8,408,156 B2
(45) Date of Patent: Apr. 2, 2013

(54) PASSENGER REMINDER SYSTEM

(76) Inventor: Karen Elaine Banda, Harlingen, TX (US)

(*) Notice: Subject to any disclaimer, the term of this patent is extended or adjusted under 35 U.S.C. 154(b) by 306 days.

(21) Appl. No.: 12/891,095

(22) Filed: Sep. 27, 2010

(65) Prior Publication Data

US 2012/0074757 A1 Mar. 29, 2012

(51) Int. Cl.
*B60Q 9/00* (2006.01)
*B60R 22/00* (2006.01)

(52) U.S. Cl. .................................. 116/28 R; 116/306

(58) Field of Classification Search ............... 116/28 R, 116/200, 306, 307; 40/591, 593; 292/288; 340/457, 457.1; 280/727, 801.1
See application file for complete search history.

(56) References Cited

U.S. PATENT DOCUMENTS

| | | | | |
|---|---|---|---|---|
| 2,187,761 A | * | 1/1940 | Torrens | 200/543 |
| 3,964,045 A | * | 6/1976 | Conley | 340/575 |
| 3,968,669 A | * | 7/1976 | Coleman | 70/456 R |
| 4,208,778 A | | 6/1980 | Ellens | |
| 4,212,260 A | * | 7/1980 | Splan | 116/28 R |
| 4,236,479 A | | 12/1980 | Walker et al. | |
| 4,499,456 A | | 2/1985 | Turpin et al. | |
| 4,653,422 A | | 3/1987 | Allen | |
| 4,747,616 A | * | 5/1988 | Burris | 280/807 |
| 4,936,244 A | * | 6/1990 | Hansen et al. | 116/28 R |
| 5,046,446 A | | 9/1991 | Sumrall et al. | |
| 5,058,523 A | | 10/1991 | Mikkonen et al. | |
| 5,269,392 A | * | 12/1993 | Perrotti | 180/287 |
| 5,482,314 A | | 1/1996 | Corrado et al. | |
| 5,502,912 A | * | 4/1996 | LeBoff et al. | 40/643 |
| 5,624,136 A | * | 4/1997 | McGlothlin et al. | 280/801.1 |
| 5,971,432 A | | 10/1999 | Gagnon et al. | |
| 6,104,293 A | | 8/2000 | Rossi | |
| 6,922,147 B1 | | 7/2005 | Viksnins et al. | |
| 7,170,401 B1 | | 1/2007 | Cole | |
| 7,207,370 B2 | | 4/2007 | Snyder et al. | |
| 7,230,530 B1 | | 6/2007 | Almquist | |
| 7,457,695 B1 | | 11/2008 | Fields et al. | |
| 7,908,777 B1 | * | 3/2011 | Beardsley | 40/320 |
| 8,161,900 B2 | * | 4/2012 | Munson | 116/28 R |
| 2006/0176183 A1 | * | 8/2006 | Jetton | 340/573.1 |
| 2007/0220793 A1 | | 9/2007 | Mappes | |
| 2009/0172982 A1 | * | 7/2009 | Bell | 40/541 |
| 2009/0243861 A1 | * | 10/2009 | Ortiz | 340/573.1 |

FOREIGN PATENT DOCUMENTS

JP 55004248 A * 1/1980

* cited by examiner

*Primary Examiner* — R. A. Smith
(74) *Attorney, Agent, or Firm* — D'Ambrosio & Menon, PLLC

(57) ABSTRACT

A passenger reminder system for reminding a driver-caregiver, upon exiting a vehicle, that a passenger remains in the vehicle. Embodiments of the passenger reminder system generally comprise one or more straps or other barriers used to connect a driver's seat belt to the interior of the driver side front door. When the driver's door is open, the strap of the passenger reminder system extends from the seat belt to the interior of the driver's door, impeding the driver-caregiver from exiting the car. This hindrance reminds the driver-caregiver that another passenger is onboard and prompts the removal of the passenger.

33 Claims, 2 Drawing Sheets

PASSENGER REMINDER SYSTEM

FIELD OF THE INVENTION

The invention relates to a passenger reminder system. In particular, the invention relates to a passenger reminder system to prevent a caregiver from leaving an incapacitated passenger within a vehicle.

BACKGROUND OF THE INVENTION

When an incapacitated passenger is left unattended in a vehicle, grave consequences may result. The temperature in a parked vehicle in the summertime may exceed 140° F. Of particular significance is the possibility of leaving young children in a vehicle, because a child is more vulnerable to temperature extremes. In 2010 alone, more than 30 deaths occurred in the United States due to hyperthermia (heat stroke) of children left in vehicles. More than 400 such deaths have occurred over the past 12 years, about half of which were caused by the unintentional leaving of a child in a vehicle by a caregiver. Caregivers who have experienced this tragic situation frequently report they were simply too distracted or busy to realize that the child was still in the vehicle.

In addition to hyperthermia and hypothermia (the opposite of hyperthermia, involving extreme cold temperatures), a passenger left unattended in a vehicle may be exposed to other threats. For example, a stranger may attempt to kidnap the passenger. The passenger may also suffer serious emotional trauma after being left unattended inside the vehicle. Thus, there is a need for a passenger reminder system to help caregivers remember to remove a passenger from a vehicle.

SUMMARY OF THE INVENTION

The present invention is directed to apparatus and methods for reminding a driver-caregiver, upon exiting a vehicle, that an incapacitated passenger is still in the vehicle. The passenger may be a child, an incapacitated adult, a pet or the like that should not be left alone in the vehicle. As utilized herein, the term "automobile" includes any vehicle capable of carrying passengers and may be used herein interchangeably with the term "vehicle." A particularly significant application of this invention is child safety, because some children are not capable of getting out of vehicles on their own. Embodiments of the passenger reminder system generally comprise one or more straps or other barriers used to connect a driver's seat belt to the interior of the driver side front door. When the driver's door is open, the strap of the passenger reminder system extends from the seat belt to the interior of the driver's door, impeding the driver-caregiver from exiting the vehicle. This hindrance from exiting the vehicle reminds the driver-caregiver that another passenger is onboard and prompts the removal of the passenger.

In one embodiment, the passenger reminder system may comprise one or more straps of a length sufficient to extend from the seat belt to the driver's door. The one or more straps connect to the seat belt at a first end, and to the driver's door at a second end. The first end may be mounted to the seat belt by various means for mounting. The first end may also comprise a housing for containing the strap in a coiled state, the housing in some embodiments comprising a reel for coiling the strap, means for withdrawing the strap from the housing, and an opening at one end of the housing to allow a free end of the strap to be withdrawn from the housing.

The second end of the strap may comprise means for coupling the strap to the interior of the door on the driver side. One or more connecting means may attach to the interior of the driver side door by means of stitching, adhesive loop, or other means. The one or more connecting means may further connect to the means for coupling, effectively binding the second end of the strap to the driver side front door. The strap may be of sufficient length to be connected to the connection means when the door is in an open position.

One of the embodiments of this invention may include a system wherein the second end of the strap is affixed to the interior of the door by a means for securing of sufficient width to insert between the driver's door and a window within the driver side front door.

In another embodiment of the system, the strap may comprise two detachable sections, a first section and a second section, with mating members that allow the two sections of the strap to be attached to one another. In this embodiment, the first end of the strap may connect to the seat belt by means for mounting, and the second end of the strap may connect to the interior of the driver side front door by one or more connecting means.

Methods for installing embodiments of the present invention comprises assembling one or more straps, the strap having a length sufficient to extend from the seat belt to the driver's door, the strap connectable to the seat belt and the driver's door; installing a means for securing the strap to the interior of the driver's door; and mounting a first end of the strap onto the driver's seat belt.

The apparatus and methods may further comprise adding a visual or audible reminder to the strap to remind the vehicle driver-caregiver to remove the passenger.

Various objects, features, aspects, and advantages of the present invention will become more apparent from the following detailed description of preferred embodiments of the invention, along with the accompanying drawings in which like numerals represent like components.

DETAILED DESCRIPTION

The present invention relates to a system for reminding a caregiver about an incapacitated passenger in a vehicle. The passenger may be a child, an incapacitated adult, a pet or the like that should not be left alone in the vehicle. As utilized herein, the term "automobile" includes any vehicle capable of carrying passengers and may be used herein interchangeably with the term "vehicle." The passenger reminder system prompts the caregiver to remember to remove the passenger before leaving the vehicle. Since a child is the most frequently vulnerable passenger, the claims refer to a child reminder system. However, the term "child" includes any other incapacitated passenger and is herein used interchangeably with the term "passenger."

Generally, the passenger reminder system comprises one or more straps that, when engaged, form a barrier between the seat belt worn by the caregiver and the interior side of the driver's door. Therefore, when the driver-caregiver opens the car door, the one or more straps prevent the driver-caregiver from exiting. It is this barrier that prompts the driver-caregiver to remember to remove the passenger before leaving the vehicle. Specific design details of this invention have been provided for illustration, but should not be considered limiting. Readers of skill in the art will recognize that many variations of these illustrative embodiments may be implemented consistent with the scope of the invention as described by the appended claims.

Figure 1:
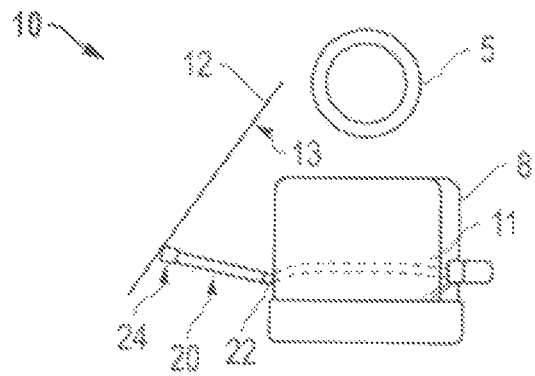
FIG. 1 is a posterior view of a vehicle's driver seat, seat belt, steering wheel, door, and window, with a strap positioned according to one or more embodiments of the present invention.
Figure 2:
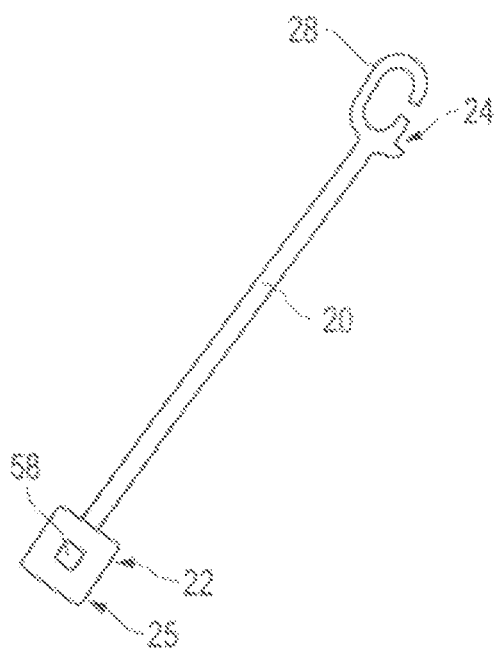
FIG. 2 is a perspective view of a strap according to one or more embodiments of the present invention.

FIG. 1 illustrates one embodiment of the passenger reminder system 10, and FIG. 2 illustrates a strap 20. In FIG. 1, the driver's seat 8 is seen from a posterior perspective, with the position of the fastened seat belt 11 indicated. The driver's side door 12, driver's window 15, and steering wheel 5 are shown. In this embodiment, the system comprises one strap 20, having a first end 22 and a second end 24. Additional straps may be used. Also, a cord, rope, string, strip of cloth, or any flexible elongated barrier may be used in place of the strap 20 to prevent the driver-caregiver from exiting. In one embodiment, the strap 20 may be of a width of approximately between one inch and two inches, but the width of the strap 20 may vary in other embodiments. The strap 20 may comprise any material suitable for use as straps in a vehicle and may be expandable or elastic to ensure convenience and comfort for the user. The strap 20 or other barrier may be of a length sufficient to extend from the seat belt 11 to the driver's side door 12.

In one embodiment, the strap 20 comprises a sufficient length to extend from the driver's seat belt 11, when latched, to the interior of the driver side front door 13, when the door is open.

The first end 22 of the strap 20 may comprise means for mounting 25 the strap 20 onto the seat belt 11, as illustrated in FIG. 2. In various embodiments, the means for mounting 25 may comprise an adhesive loop that attaches the first end 22 to the seat belt 11. As utilized herein, an adhesive loop means a loop created by sweeping the first end 22 around the seat belt 11, forming a loop, and adhering the swept portion of the first end 22 to an unswept portion of the first end 22 or the strap 20. In other embodiments, the means for mounting 25 may be at least one connector characterized as mechanical, chemical, or nonmechanical and nonchemical, and combinations thereof. Examples of such connectors include a buckle system, a grommet, a snap, a clip, a clamp, a hasp, a clasp, a knot, a set of magnets, a temporary adhesive, Velcro®, a hook and eye system, a nut and bolt system, and the like presently known in the art, and combinations thereof.

Figure 4:
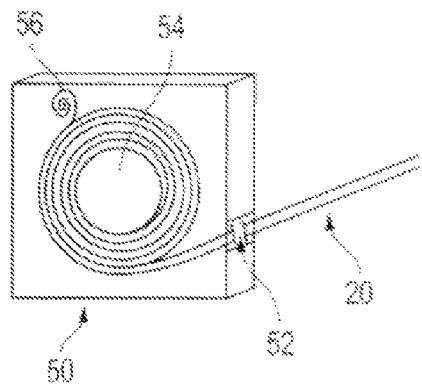
FIG. 4 is a perspective view of a housing for containing the strap in a coiled state according to one or more embodiments of the present invention.

In one embodiment, the first end 22 of the strap 20 may be modified to further comprise a housing 50 for containing the strap 20 in a coiled state, illustrated in FIG. 4. The housing 50 may be attached to the seat belt 11 by a means for fastening 58, comprising at least one connector characterized as mechanical, chemical, or nonmechanical and nonchemical, and combinations thereof. Examples of such connectors include a buckle system, a grommet, a snap, a clip, a clamp, a hasp, a clasp, a knot, a set of magnets, a temporary adhesive, Velcro®, a hook and eye system, a nut and bolt system, and the like presently known in the art, and combinations thereof. The housing 50 may comprise a reel 54 within the housing 50 for coiling the strap 20, and a spring 56 for maintaining tension on the reel 54 to keep the strap 20 in the wound state when not in use. The spring 56 may be attached to the reel 54 such that when the reel 54 spins with the force of withdrawing the free end of the strap 20, the spring 56 becomes uncoiled. In this state, the spring 56 will generate a sufficient tension on the reel 54 to cause the strap 20 to automatically recoil into the housing 50 around the reel 54 when no force is applied by a user, or when the free end of the strap 20 is not secured in use. In this embodiment, the "free end" of the strap 20 refers to the portion of the strap 20 that protrudes outside the housing 50 when the strap 20 is in a wound state, which in turn is the portion of the strap 20 nearest its second end 24.

Referring again to FIG. 4, an opening 52 at one end of the housing 50 may be used to allow the strap 20 to be withdrawn from or recoiled into the housing 50, under tension applied by either the driver-caregiver or the spring 56, respectively. As used herein, the term "opening" refers to a hole, gap, crack, slit, or clearance of any kind. In the embodiment shown in FIG. 4, the opening is situated near one end of a narrow face of the housing 50, but the opening may be situated medially along one face of the housing 50, or at any other location on the housing surface appropriate to permit winding and passage of the strap 20. The opening 50 may be of a diameter of sufficient width to allow the free end of the strap 20 to be withdrawn through the opening 52, but narrow enough to prevent the free end from being pulled completely inside the housing 50. The housing 50 may be of a dimension (width and volume) sufficient to contain the majority of the strap 20 when in a wound state.

In another embodiment (not shown), the housing 50 may further comprise a button. In this embodiment, the button may apply force to the strap 20 within the housing 50 or to the reel 54. This force may prevent the strap 20 from winding around the reel 54 until the force is removed. Alternatively, the force may be removed by pressing the button.

Figure 5:
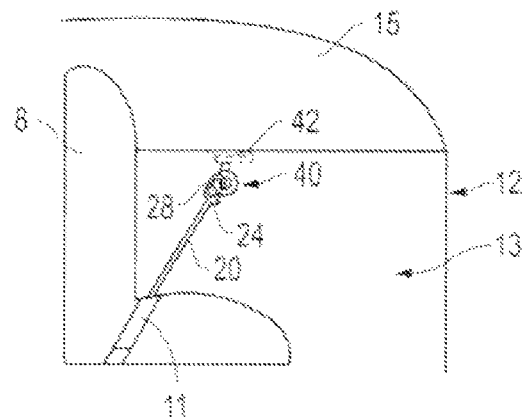
FIG. 5 is a side view of a vehicle's seat, seat belt, door, and window, with a strap having a means for mounting the strap onto the door, according to one or more embodiments of the present invention.
Figure 5A:
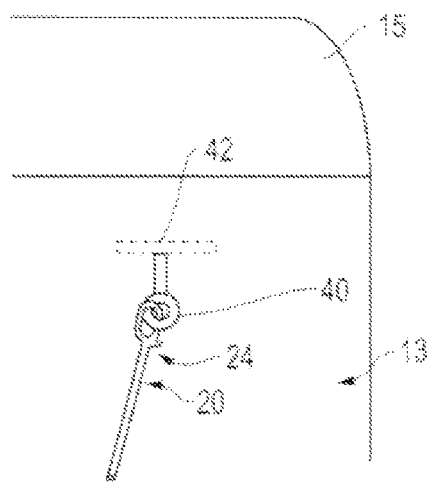
FIG. 5a is a perspective view of a strap having a connecting means according to one or more embodiments of the present invention.

In one embodiment, the system may comprise means for coupling 28 the second end 24 of the strap 20 to one or more connecting means 40 adapted to be attached to the interior of the driver side front door 13, as illustrated in FIG. 5. Thus, the one or more connecting means 40 may be attached both to the driver side front door 12 at one end, and to the means for coupling 28 at the other end, in various embodiments. FIGS. 5 and 5a illustrate a side and perspective view, respectively, of the driver's seat 8, seat belt 11, driver side front door 12, and window 15.

In one embodiment, the one or more connecting means 40 may be attached to the interior of the driver side front door 13 by stitching 42 into the material covering the surface of the door, illustrated in FIG. 5a. In another embodiment, the one or more connecting means 40 may be attached to an extension of the interior of the driver side front door 13. In a further embodiment, Velcro® may be used to attach the one or more connecting means 40 to the interior of the driver side front door 13. In yet other embodiments, the one or more connecting means 40 may be attached to the driver side front door 12 using at least one connector characterized as mechanical, chemical, or nonmechanical and nonchemical, and combinations thereof. Examples of such connectors include a buckle system, a grommet, a snap, a clip, a clamp, a hasp, a clasp, a knot, a set of magnets, a temporary adhesive, Velcro®, a hook and eye system, a nut and bolt system, and the like presently known in the art, and combinations thereof.

The means for coupling 28 may comprise an adhesive loop that loops through the one or more connecting means 40. In other embodiments, the means for coupling 28 comprises at least one connector characterized as mechanical, chemical, or nonmechanical and nonchemical, and combinations thereof. Examples of such connectors include a buckle system, a grommet, a snap, a clip, a clamp, a hasp, a clasp, a knot, a set of magnets, a temporary adhesive, Velcro®, a hook and eye system, a nut and bolt system, and the like presently known in the art, and combinations thereof. In various embodiments, thus, the one or more connecting means 40 and the means for coupling 28 comprise compatible means for attaching to one another.

Figure 6:
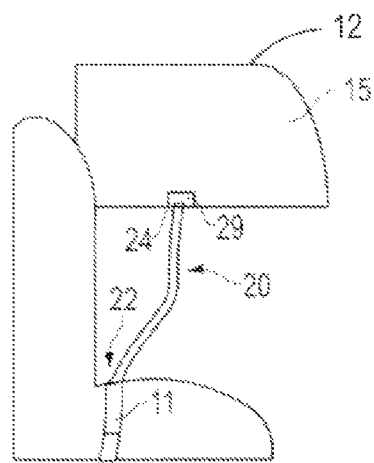
FIG. 6 is a perspective view of a vehicle's seat, seat belt, door, and window, with a strap having a means for securing the strap to the driver's side door according to one or more embodiments of the present invention.

In another embodiment, illustrated in FIG. 6, the second end 24 of the strap 20 may comprise a means for securing 29 the strap 20 to the driver side front door 12, the means for securing 29 being a width sufficient to insert between the driver side front door 12 and the window 15. In this embodiment, the driver-caregiver can insert the means for securing 29 into the space between the door 12 and the window 15 after latching the seat belt 11, and serve the purpose of attaching the strap 20 to the driver side front door 12.

In some embodiments, the means for securing 29 may be similar to the size and rigidity of a plastic credit card. The means for securing 29 may also comprise a material having the material property of elasticity sufficient to insert the means for securing 29 into the space between the door 12 and the window 15 without compromising the purpose and function of the means for securing 29. For example, the means for securing 29 may comprise an elastomer. In other embodiments, the means for securing 29 may comprise a wedge and may be connected to the second end 24 of the strap 20 by at least one connector characterized as mechanical, chemical, or nonmechanical and nonchemical, and combinations thereof. Examples of such connectors include a buckle system, a grommet, a snap, a clip, a clamp, a hasp, a clasp, a knot, a set of magnets, a temporary adhesive, Velcro®, a hook and eye system, a nut and boll system, and the like presently known in the art, and combinations thereof. In one embodiment, the wedge may be detachable. For example, the wedge may be perforated with a small opening, said opening reinforced with a metal grommet insert. A thin, short string or cord may be passed through this opening of the wedge and fastened using at least one connector characterized as mechanical, chemical, or nonmechanical and nonchemical, and combinations thereof. Examples of such connectors include a buckle system, a grommet, a snap, a clip, a clamp, a hasp, a clasp, a knot, a set of magnets, a temporary adhesive, Velcro®, a hook and eye system, a nut and bolt system, and the like presently known in the art, and combinations thereof. The opposing end of the string or cord may be similarly attached to the second end 24 of the strap 20. In another preferred embodiment, the second end 24 of the strap 20 may be directly connected to the wedge.

Figure 3:
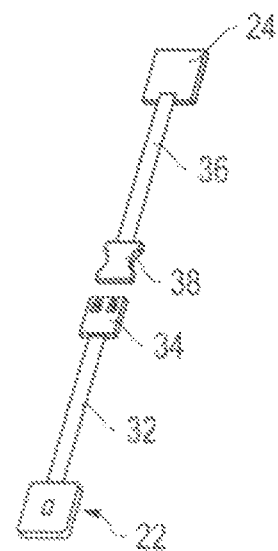
FIG. 3 is a perspective view of a strap having two detachable sections and two mating members according to one or more embodiments of the present invention.

In one embodiment, illustrated in FIG. 3, the strap 20 may comprise two detachable sections, a first section 32 and a second section 36, with a first mating member 34 and a second mating member 38, to allow the two detachable sections to be attached to each other. In this embodiment, the first mating member 34 may be opposite the first end of the strap 22, and the second mating member 38 may be opposite the second end of the strap 24. The first end of the strap 22 and the second end of the strap 24 may, in some embodiments, remain attached to the seat belt 11 and the interior of driver side front door 13, respectively, allowing the driver-caregiver to "clip-in" to the system 10 by simply connecting the two detachable sections. The first mating member 34 and the second mating member 38 may be adapted to comprise means for mating the two detachable sections, 32 and 36. Said means for mating may comprise at least one connector characterized as mechanical, chemical, or nonmechanical and nonchemical, and combinations thereof. Examples of such connectors include a buckle system, a grommet, a snap, a clip, a clamp, a hasp, a clasp, a knot, a set of magnets, a temporary adhesive, Velcro®, a hook and eye system, a nut and bolt system, and the like presently known in the art, and combinations thereof. In one embodiment, illustrated in FIG. 3, the means for mating may be a buckle system. In another embodiment, the means for mating may be a variation of the familiar hook and ring commonly used to attach dog leashes to dog collars.

In various embodiments comprising two detachable sections, the first end 22 of the strap 20 may comprise means for mounting 25 to the seat belt 11, as illustrated in FIG. 2 and described previously. The second end 24 of the strap 20 may comprise one or more means for coupling 28 to one or more connection means 40 attached to the interior of the driver's side door 13, as illustrated in FIGS. 2, 5, 5a, and 6, and described previously. The second end 24 of the strap 20 may be adapted to comprise a means for securing 29 that, in one embodiment, may be detachable. The means for securing 29 may have a width sufficient to insert between the driver side front door 12 and the window 15, as illustrated in FIG. 6 and described previously.

Methods for installing embodiments of the present invention comprise assembling one or more straps 20 having a length sufficient to extend from the seat belt 11 to the driver's door 12, the strap 20 connectable to the seat belt 11 and the driver's door 12. The methods further comprise installing a means for securing 29 the strap to the interior of the driver's door 13. In one embodiment, installing the means for securing 29 comprises installing a connecting means 40, the connecting means 40 engaging a second end 24 of the strap 20 when in use. In another embodiment, installing the means for securing 29 comprises installing a wedge positioned at the second end 24 of the strap 20, the wedge comprising a width sufficient to wedge between the driver's door 12 and a window 15 within the driver's door 12. Installing the means for securing 29 may also comprise, in another embodiment, a card positioned at the second end 24 of the strap 20, the card configured to be insertable between the driver's door 12 and the window 15 of the driver's door 12. In some embodiments, the methods further comprise mounting a first end 22 of the strap 20 onto the driver's seat belt 11. According to an embodiment of the present invention, a method further comprises mounting a housing 50 for the strap 20 to the first end of the strap 20.

Another embodiment of the present invention (not shown) comprises adding a visual or audible reminder to the strap to remind the driver of the vehicle to remove the passenger. In one embodiment, this reminder may comprise an electronic audible alarm or light, which sounds or blinks, respectively, when the one or more straps 20 is disconnected from either the seat belt 11 or the connecting means 40 attached to the driver side front door 12. Alternatively, in a system in which the one or more straps 20 comprises two sections, a first section 32 and a second section 36, an electronic audible alarm or blinking light could be attached near the location where the first mating member 34 of the first section 32 and the second mating member 38 of the second section 36 attach to one another. When the mating members are disengaged from one another, the electronic audible alarm or blinking light could be activated.

The inventive concepts disclosed herein are capable of many other embodiments while remaining within the scope of the present invention. The invention is not limited to the described embodiments, versions or examples, which are included to enable a person having ordinary skill in the art to make and use the invention when combined with information and knowledge available to said person with ordinary skill in the art. For example, some variations may include modifications of the type of material used for the one or more straps 20; the exact dimensions of the one or more straps 20; the device used as a means for mounting 25, means for coupling 28, means for securing 29, the attachment of the first mating member 34 to the second mating member 38, and the connecting means 40. The fastening mechanism is therefore not considered exhaustive and several substitutions and combinations could be used without departing from the spirit and scope of the invention. Further, the caregiver is described as the vehicle driver, but may also be a fellow passenger in either the front seat or rear seat of the vehicle. The passenger may be a child located in the rear seat of the vehicle, but may also be an incapacitated adult, or a pet. To the extent that such modifications fall within the scope of the present invention, they are intended to be covered by this patent.

What is claimed is:

1. A child reminder system for an automobile driver, the automobile comprising a driver's seat belt and a door adjacent to the driver, the driver's door comprising an interior surface, the system comprising:
   one or more straps, the one or more straps comprising a length sufficient to extend from the seat belt to the driver's door, the one or more straps connectable to the seat belt and the driver's door.

2. The system of claim 1 wherein the one or more straps have a first end connectable to the seat belt and a second end connectable to the driver's door.

3. The system of claim 2, wherein the first end of the one or more straps comprises means for mounting the one or more straps onto the seat belt.

4. The system of claim 3, wherein the means for mounting comprises an adhesive loop.

5. The system of claim 3, wherein the means for mounting is selected from a group comprising a buckle system, a grommet, a snap, a clip, a clamp, a hasp, a clasp, a knot, a set of magnets, a temporary adhesive, Velcro®, a hook and eye system, a nut and bolt system, and combinations thereof.

6. The system of claim 2, wherein the first end of the one or more straps comprises: a housing for containing the one or more straps in a coiled state, wherein the housing comprises:
   a reel within the housing for coiling the one or more straps;
   means for withdrawing the one or more straps from the housing;
   and an opening at one end of the housing, the housing configured to allow a free end of the one or more straps to be withdrawn through the opening.

7. The system of claim 6 further comprising means for fastening the housing to the seat belt.

8. The system of claim 2, wherein the second end of the one or more straps comprises a means for coupling, the system further comprising one or more connecting means for engaging the means for coupling, the one or more connecting means adapted to be affixed to the interior of the driver's door.

9. The system of claim 8 wherein the one or more connecting means comprises a detachable connecting means.

10. The system of claim 9, wherein the means for coupling comprises an adhesive loop, the adhesive loop for engaging the one or more connecting means.

11. The system of claim 9 wherein the means for coupling and the one or more connecting means are selected from a group comprising a buckle system, a grommet, a snap, a clip, a clamp, a hasp, a clasp, a knot, a set of magnets, a temporary adhesive, Velcro®, a hook and eye system, a nut and bolt system, and combinations thereof.

12. The system of claim 8 wherein the one or more connecting means are attached to the interior of the driver side front door by stitching.

13. The system of claim 8, wherein the one or more straps comprise a sufficient length to be connected to the one or more connecting means when the door is in an open position.

14. The system of claim 2, wherein the second end is affixed to the interior of the driver's door by a means for securing, the means for securing comprising a width sufficient to insert between the driver's door and a window within the driver's door.

15. The system of claim 14, wherein the means for securing is detachable.

16. The system of claim 1, wherein the one or more straps comprise two detachable sections, a first section and a second section, the first section comprising a first mating member opposite the first end of the one or more straps and the second section comprising a second mating member opposite the second end of the one or more straps.

17. The system of claim 1, further comprising applying a visual or audible reminder to the one or more straps, the visual or audible reminder further reminding the automobile driver to remove the passenger.

18. A method for installing a child reminder system for an automobile driver, the automobile comprising a driver's seat belt and a door adjacent to the driver, the driver's door comprising an interior surface and a window, the method comprising:
   assembling the elements of a child reminder system referred to in claim 1;
   installing a means for securing the one or more straps to the interior of the driver's door; and
   mounting a first of end of the one or more straps onto the driver's seat belt.

19. The method of claim 18 wherein installing the means for securing the one or more straps comprises installing a connecting means, the connecting means engaging a second end of the one or more straps when in use.

20. The method of claim 18 wherein installing the means for securing the one or more straps comprises installing a wedge positioned at the second end of the one or more straps, the wedge comprising a width sufficient to wedge between the driver's door and a window within the driver's door.

21. The method of claim 18 wherein installing the means for securing the one or more straps comprises installing a card positioned at the second end of the one or more straps, the card configured to be insertable between the driver's door and the window of the driver's door.

22. The method of claim 18 further comprising mounting a housing for the one or more straps to the first end of the one or more straps.

23. The method of claim 18, further comprising adding a visual or audible reminder to the one or more straps, the visual or audible reminder further reminding the automobile driver to remove the passenger.

24. A child reminder system for an automobile driver, the automobile comprising a driver's seat belt and a door adjacent to the driver, the driver's door comprising an interior surface, the system comprising:

a strap connectable to the seat belt and the driver's door, the strap comprising a length sufficient to extend from the seat belt to the driver's door, the strap having a first end connectable to the seat belt and a second end connectable to the driver's door, the strap comprising two detachable sections, a first section and a second section, the first section comprising a first mating member opposite the first end of the strap and the second section comprising a second mating member opposite the second end of the strap; and one or more connecting means for engaging the second end of the strap, the one or more connecting means adapted to be affixed to the interior of the driver's door.

25. The system of claim 24, wherein the first end of the strap comprises means for mounting the strap onto the seat belt.

26. The system of claim 25, wherein the means for mounting is selected from a group comprising a buckle system, a grommet, a snap, a clip, a clamp, a hasp, a clasp, a knot, a set of magnets, a temporary adhesive, Velcro®, a hook and eye system, a nut and bolt system, and combinations thereof.

27. A child reminder system for an automobile driver, the automobile comprising a driver's seat belt and a door adjacent to the driver, the driver's door comprising an interior surface, the system comprising:

one or more straps, the one or more straps comprising a length sufficient to extend from the seat belt to the driver's door, the one or more straps connectable to the seat belt and the driver's door;

the one or more straps comprising:

a first end connectable to the seat belt and a second end connectable to the driver's door, the first end of the one or more straps comprising a means for mounting the one or more straps onto the seat belt and the second end affixed to the driver's door by a means for securing, the means for securing comprising a width sufficient to insert between the driver's door and a window within the driver's door.

28. The system of claim 27 wherein the means for securing the one or more straps comprises a connecting means, the connecting means engaging a second end of the one or more straps when in use.

29. The system of claim 27 wherein the means for securing the one or more straps comprises a wedge positioned at the second end of the one or more straps, the wedge comprising a width sufficient to wedge between the driver's door and a window within the driver's door.

30. The system of claim 29 wherein the wedge comprises a first side and a second side, the first side comprising a flange for hooking onto the driver's door.

31. The system of claim 27 wherein the means for securing the one or more straps comprises a flat configuration comprising a width sufficient to fit between the driver's door and a window within the driver's door.

32. A child reminder system for an automobile driver, the automobile comprising a driver's seat and a door adjacent to the driver, the driver's door comprising an interior surface, the system comprising:

one or more straps, the one or more straps comprising a length sufficient to extend from the seat to the driver's door, the one or more straps connectable to the seat and the driver's door; and means for securing the one or more straps comprises installing a wedge positioned at an end of the one or more straps, the wedge comprising a width sufficient to wedge between the driver's door and a window within the driver's door.

33. A child reminder system for an automobile driver, the automobile comprising a driver's seat and a door adjacent to the driver, the driver's door comprising an interior surface, the system comprising:

one or more straps, the one or more straps comprising a length sufficient to extend from the seat to the driver's door, the one or more straps connectable to the seat and the driver's door; and means for securing the one or more straps comprises installing a card positioned at an end of the one or more straps, the card configured to be insertable between the driver's door and the window of the driver's door.

* * * * *